(12) United States Patent
de Wet et al.

(10) Patent No.: US 11,498,768 B2
(45) Date of Patent: Nov. 15, 2022

(54) METHOD OF REFURBISHING A BUCKET WHEEL RECLAIMER

(71) Applicant: Technological Resources Pty. Limited, Melbourne (AU)

(72) Inventors: Gustav de Wet, Perth (AU); Heinz Nitsche, Perth (AU); Anthony Radici, Perth (AU); Dirk Horn, Osborne Park (AU); Jochen Maas, Perth (AU); Andrew Dorrington, Perth (AU); Rudolf Pletz, Leoben (AT); Belmin Smajlovic, Leoben (AT); Lukas Dösinger, Leoben (AT); Wolfgang Schlimme, Perth (AU); Patrick Neufeldt, Leipzig (DE); Peter Mundik, Perth (AU); Miodrag Markovic, Perth (AU); Burkhard Petack, Leipzig (DE)

(73) Assignee: Technological Resources Pty. Limited, Melbourne (AU)

( * ) Notice: Subject to any disclaimer, the term of this patent is extended or adjusted under 35 U.S.C. 154(b) by 0 days.

(21) Appl. No.: 17/433,830

(22) PCT Filed: Feb. 25, 2020

(86) PCT No.: PCT/AU2020/050166
§ 371 (c)(1),
(2) Date: Aug. 25, 2021

(87) PCT Pub. No.: WO2020/172707
PCT Pub. Date: Sep. 3, 2020

(65) Prior Publication Data
US 2022/0144551 A1 May 12, 2022

(30) Foreign Application Priority Data
Feb. 25, 2019 (AU) ................... 2019900597

(51) Int. Cl.
*B65G 15/60* (2006.01)
*B65G 21/06* (2006.01)
(Continued)

(52) U.S. Cl.
CPC ............. *B65G 15/60* (2013.01); *B65G 21/06* (2013.01); *B65G 21/10* (2013.01); *B65G 39/12* (2013.01);
(Continued)

(58) Field of Classification Search
CPC ........ B65G 15/60; B65G 21/06; B65G 21/10; B65G 39/12; B65G 2201/045; E02F 3/181; E02F 7/02; E02F 7/06
See application file for complete search history.

(56) References Cited

U.S. PATENT DOCUMENTS

| | | | |
|---|---|---|---|
| 4,793,470 A | 12/1988 | Andersson | |
| 6,394,262 B1 * | 5/2002 | Stoll | B65G 39/12 198/825 |

(Continued)

FOREIGN PATENT DOCUMENTS

| | | |
|---|---|---|
| FR | 3033321 A1 | 9/2016 |
| KR | 20030050691 A | 6/2003 |
| WO | 2017106943 A1 | 6/2017 |

OTHER PUBLICATIONS

Mar. 26, 2019—(AU) Search Report—App. No. 2019900597—25 pages.
Mar. 19, 2020—(WO) International Search Report and Written Opinion—App. No. PCT/AU2020/050166—15 pages.

*Primary Examiner* — Mark A Deuble
(74) *Attorney, Agent, or Firm* — Banner & Witcoff, Ltd.

(57) ABSTRACT

A method 10 of refurbishing a bucket wheel reclaimer (BWR) 41 having structural frame 68, a chute 66 supported by the structural frame 68, a yard conveyor 42 for receiving material from the chute 66 and an impact table 64 supported (Continued)

by the structural frame 68 below a portion of an upper run 44 of the yard conveyor 42. The method includes a step 12 of decoupling a current impact table 64 from the BWR structural frame 68. The impact table 64 is lowered at step 26 from the structural frame 68. Thereafter at step 14 the current impact table is moved laterally away from and to one side of the yard conveyor. At steps 16 and 18 a fresh impact table is moved laterally to a location beneath the upper run 44 of the yard conveyor and coupled to the BWR 41.

20 Claims, 15 Drawing Sheets

(51) Int. Cl.
| | | |
|---|---|---|
| *B65G 39/12* | (2006.01) | |
| *E02F 7/02* | (2006.01) | |
| *E02F 7/06* | (2006.01) | |
| *E02F 3/18* | (2006.01) | |
| *B65G 21/10* | (2006.01) | |

(52) U.S. Cl.
CPC ............... *E02F 3/181* (2013.01); *E02F 7/02* (2013.01); *E02F 7/06* (2013.01); *B65G 2201/045* (2013.01)

(56) References Cited

U.S. PATENT DOCUMENTS

| | | | | |
|---|---|---|---|---|
| 7,621,391 B2 * | 11/2009 | Matters | ................ | B65G 39/125 |
| | | | | 198/825 |
| 7,815,040 B2 * | 10/2010 | Kuiper | .................. | B65G 15/62 |
| | | | | 198/841 |
| 7,950,520 B2 * | 5/2011 | Mott | ....................... | B65G 39/12 |
| | | | | 198/825 |
| 8,328,006 B2 * | 12/2012 | Mott | ..................... | B65G 15/60 |
| | | | | 198/860.1 |
| 2009/0260956 A1 | 10/2009 | Dunn | | |
| 2010/0072033 A1 | 3/2010 | Daly et al. | | |
| 2020/0071080 A1 * | 3/2020 | Wood | ..................... | B65G 21/06 |

* cited by examiner

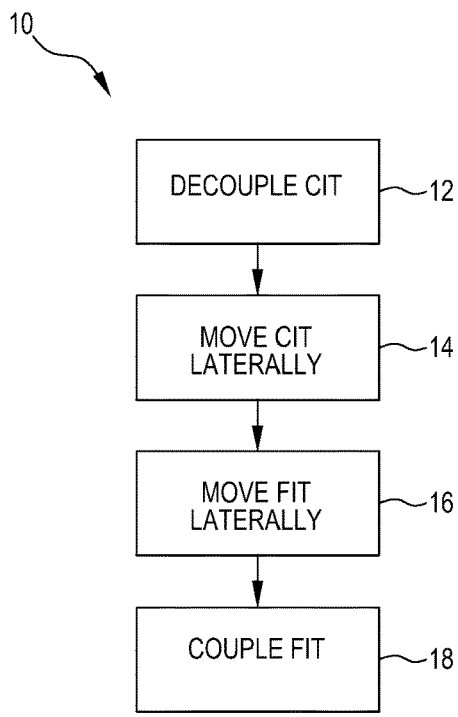
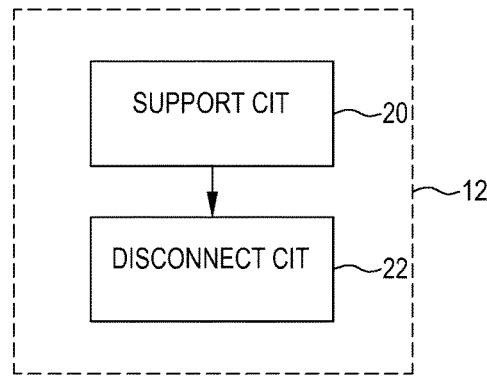
FIG. 1
FIG. 2
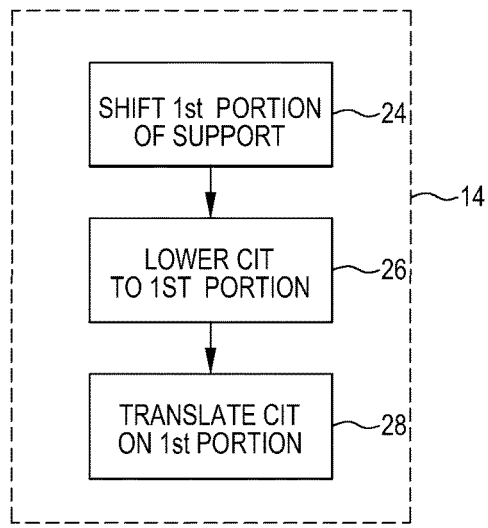
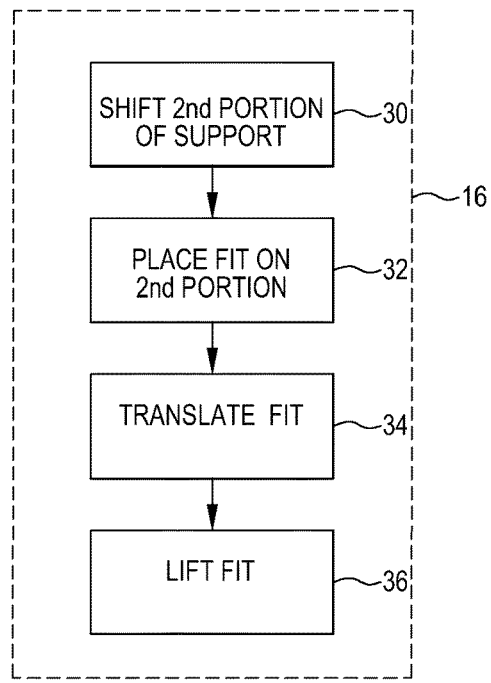
FIG. 3
FIG. 4

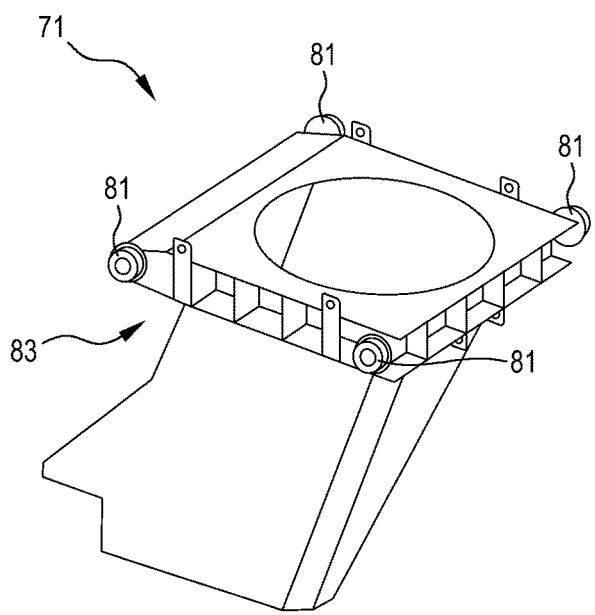
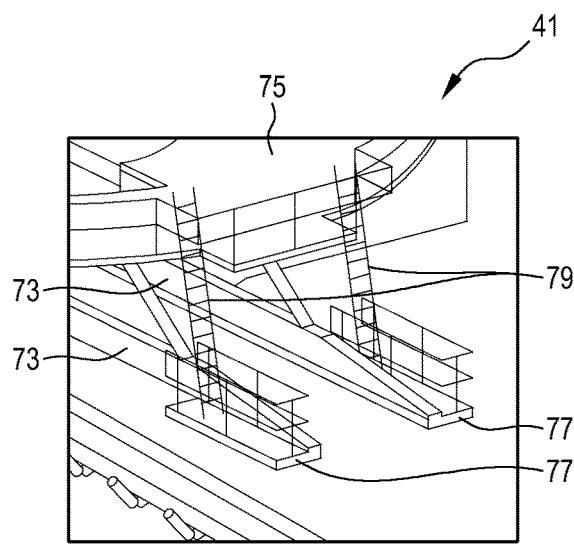
FIG. 27  FIG. 28
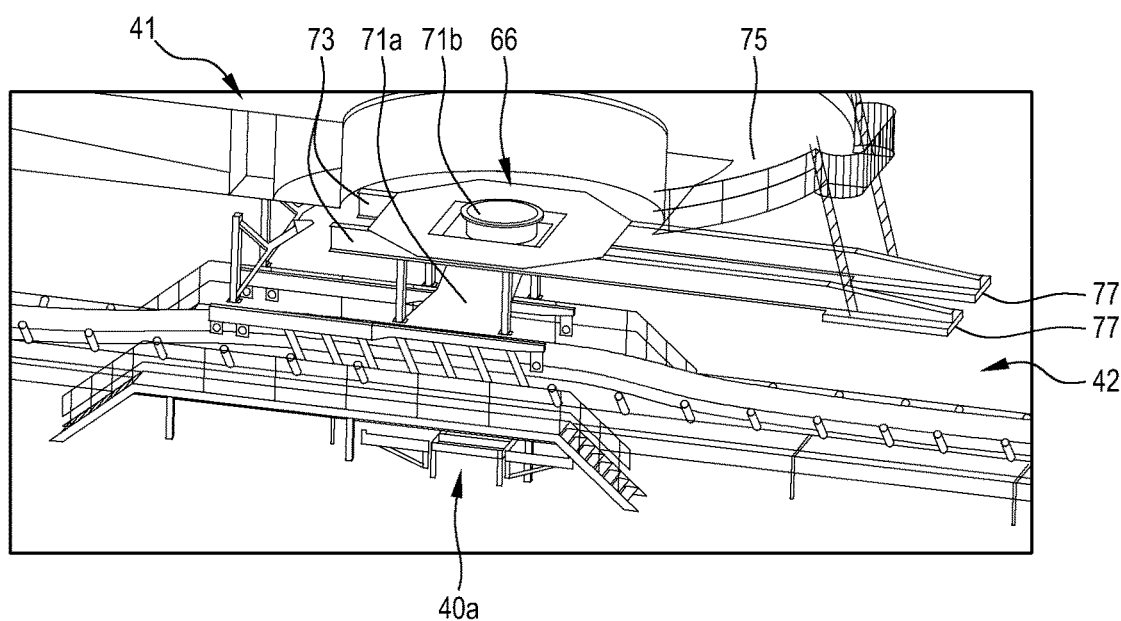
FIG. 29

METHOD OF REFURBISHING A BUCKET WHEEL RECLAIMER

CROSS-REFERENCE TO RELATED APPLICATIONS

This application is a U.S. National Stage application under 35 U.S.C. § 371 of International Application PCT/AU2020/050166, filed Feb. 25, 2020, (WO 2020/172707) which claims the benefit of priority to AU Application 2019900597 filed Feb. 25, 2019. Benefit of the filing date of each of these prior applications is hereby claimed. Each of these prior applications is hereby incorporated by reference in its entirety.

TECHNICAL FIELD

A method of refurbishing a bucket wheel reclaimer (BWR) by way of replacing an impact table is disclosed together with a support system for performing the method.

BACKGROUND ART

The maintenance and repair of a bucket wheel reclaimer (BWR) is a difficult and expensive exercise. This may involve the refurbishment of various components or assemblies of the BWR. An efficient way of refurbishment is, where possible, to replace a part or assembly with another as distinct from shutting down a BWR and performing maintenance and repair in-situ. One reason for this is that the BWR down time may be substantially less where replacement rather than in-situ repair is performed. Also, this enables multiple different components and assemblies to be replaced simultaneously using different crews.

One example of an assembly of a BWR that needs maintenance and repair is its impact table. Material carried by the boom conveyor of a BWR is feed by a chute onto the yard conveyor that runs across the impact table. The impact table including its numerous idler rollers are subjected to high dynamic forces and therefore have limited service life.

The above references to the background art do not constitute an admission that the art forms a part of the common general knowledge of a person of ordinary skill in the art.

SUMMARY OF THE DISCLOSURE

In a first aspect there is disclosed a method of refurbishing a bucket wheel reclaimer (BWR) having structural frame, a chute supported by the structural frame, a yard conveyor for receiving material from the chute and an impact table supported by the structural frame below a portion of an upper run of the yard conveyor, the method comprising:
  decoupling a current impact table from the BWR structural frame;
  lowering the current impact table from the structural frame;
  moving the current impact table laterally away from and to one side of the yard conveyor; moving a fresh impact table laterally to a location beneath the upper run of the yard conveyor; and
    coupling the fresh impact table to the structural frame.
  In one embodiment the fresh impact table may be moved laterally from a side opposite to the one side of the yard conveyor.
  In one embodiment the method comprises supporting the current impact table while the current impact table is being decoupled.

In one embodiment the method comprises, after decoupling and before moving current impact table laterally, the lowering the current impact table to an underlying support.

In one embodiment moving the current impact table laterally comprises translating the current impact table along the support.

In one embodiment translating the current impact table comprises shifting a first portion of the support from a first location to a second location wherein the current impact table is translated on the first portion of the support when the first portion is in the second location.

In one embodiment coupling the fresh impact table comprises, lifting the fresh impact table from the location beneath the upper run of the yard conveyor to facilitate connection to the BWR. In one embodiment coupling the fresh impact table comprises, lifting the fresh impact table from the location beneath the upper run of the yard conveyor to facilitate connection to the BWR; and moving the fresh impact table laterally comprises translating the fresh impact table along the support.

In one embodiment moving the fresh impact table laterally comprises placing the fresh impact table on a second portion of the support on the opposite side of the yard conveyor.

In one embodiment the method comprises moving the second portion of the support from a first location to a second location at which the fresh impact table can be supported on the underlying support.

In one embodiment the method comprises translating the fresh impact table along the second portion to the location beneath the BWR.

In one embodiment the method comprises using a machine to move the current impact table or the fresh impact table.

In one embodiment the method comprises providing a winch system as the machine.

In one embodiment the method comprises providing a jack system as the machine.

In one embodiment the method comprises before moving the current impact table laterally away from and to one side of the yard conveyor, lifting the portion of the upper run of the conveyor with respect to the impact table.

In a second aspect there is disclosed a support system for performing the method according to the first aspect comprising:
  a structure having first and second portions, the portions being moveable between respective first and second locations, wherein in the first location the portions extend in a direction parallel to the direction of travel of the yard conveyor and in the second location the portions extend in a lateral direction with respect to a direction of travel of the yard conveyor.
  In one embodiment the system comprises a plurality of jacks capable of moving vertically for supporting the impact table and elevating or lowering the impact table.
  In one embodiment the system comprises a plurality of chain blocks capable of lowering an impact table from the BWR or elevating an impact table to a connection location on the BWR.
  In one embodiment the chain blocks are deployable to translate an impact table along the first or second portions when in their respective second positions.
  In one embodiment the system comprises a winch system capable of moving the impact table along the first and second portions when in their respective second positions

BRIEF DESCRIPTION OF THE DRAWINGS

Notwithstanding any other forms which may fall within the scope of the method and support system as set forth in the Summary, specific embodiments will now be described, by way of example only, with reference to the accompanying drawings in which:

FIG. 1 is work flow showing at a high level one embodiment of the disclosed method of refurbishing a bucket wheel reclaimer (BWR) by way of replacing a current impact table (CIT) with a fresh impact table (FIT);

FIGS. 2, 3 and 4 depict respective workflows for various steps in the method shown in FIG. 1;

FIG. 27 is an illustration of a centre chute portion of the transfer chute associated with an impact table which may be swapped out or replaced at the same time as replacement of the impact table;

FIG. 28 illustrates rail beams coupled to a bucket wheel reclaimer which are used to move the centre chute portion between operational position and a location where it can be removed from the bucket wheel reclaimer;

FIGS. 29-31 show one possible sequence of operations for replacing the centre chute portion of the bucket wheel reclaimer.

DETAILED DESCRIPTION OF SPECIFIC EMBODIMENTS

FIG. 1 is work flow showing at a high level one embodiment of the disclosed method 10 of refurbishing a bucket wheel reclaimer (BWR) by way of replacing a current impact table (CIT) with a fresh impact table (FIT). The FIT can be a new or a refurbished impact table.

The method 10 very broadly includes the steps of:

12—decoupling a current impact table (CIT) from the BWR;

14—moving the current impact table laterally away from, and to one side of, the BWR;

16—moving a fresh impact table (FIT) laterally; optionally but not necessarily from an opposite side of the BWR; to a location beneath the BWR; and 18—coupling the fresh impact table to the BWR.

As explained below some of these steps include a plurality of sub step, and the method 10 also includes other steps in additional to steps 12-18. Further different embodiments may include different combinations of steps.

FIGS. 2-4 show examples of sub steps that together make up the broad steps 12, 14 and 16.

With reference to FIG. 2 the decoupling step 12 comprises the steps of:

20—supporting the CIT while it is still coupled to the BWR; and

22—disconnecting the CIT from the BWR (for example by unbolting) while being supported.

With reference to FIG. 3 the step 14 comprises the steps of:

24—shifting a first portion of a support from a first location to a second location where the first portion extends laterally away from the BWR;

26—lowering the CIT to an underlying support structure; and

28—translating the CIT laterally to one side of and away from the BWR on the first portion of the support which is in its second position as per the previous step 24.

With reference to FIG. 4 the step 16 comprises the steps of:

30—shifting a second portion of a support from a first location to a second location where the second portion extends laterally away from the BWR on a side opposite the first portion;

32—place the FIT on the second portion of the support when in the second position;

34—translating the FIT along second portion to a location underneath the BWR; and 36—lifting the FIT to the BWR where it can be connected to the BWR as per step 18.

FIGS. 5-20 illustrate an embodiment of the disclosed method 10 of refurbishing a BWR and an associated support system 40 performing the method 10.

Figure 5:
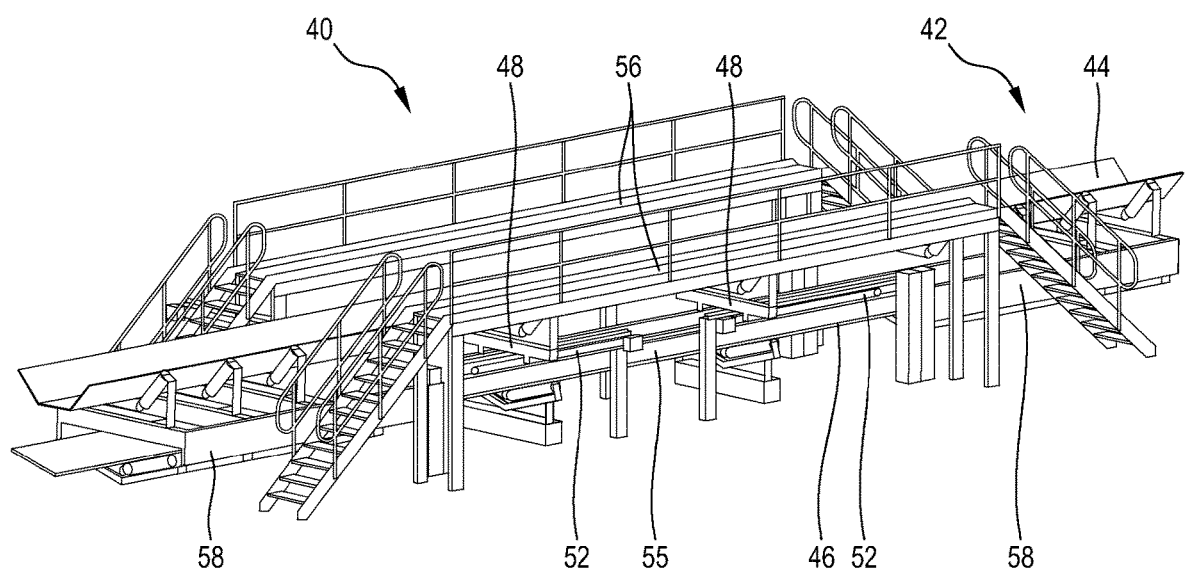
FIG. 5 is a schematic representation of a first embodiment of a support system that may be used to perform an embodiment of the disclosed method and in which rails of the support system are in their first position.

FIG. 5 shows the support system 40 in relation to a yard conveyor 42 having an upper run 44 and a return run 46. Movable idler rollers 48 are located under a portion of the upper run 44. When the BWR is parked for refurbishment of its impact table the idler rollers 48 are located beneath the impact table.

The support system 40 includes a first portion in the form of two rails 52 on one side of the conveyor 42 and a second portion in the form of two rails 54 on an opposite side of the conveyor 42 and a connecting frame 55. In FIG. 5 the rails 52, 54 are shown in a first position in which they lie parallel to the yard conveyor 42. Platforms 56 are provided on either side of the conveyor 42 to provide access for technicians to reach various parts of the BWR and in particular the impact table to facilitate the refurbishment. Also shown in FIG. 5 on either side of the support system 40 are respective banks 58 of idler rollers supporting the upper run 44.

Figure 6:
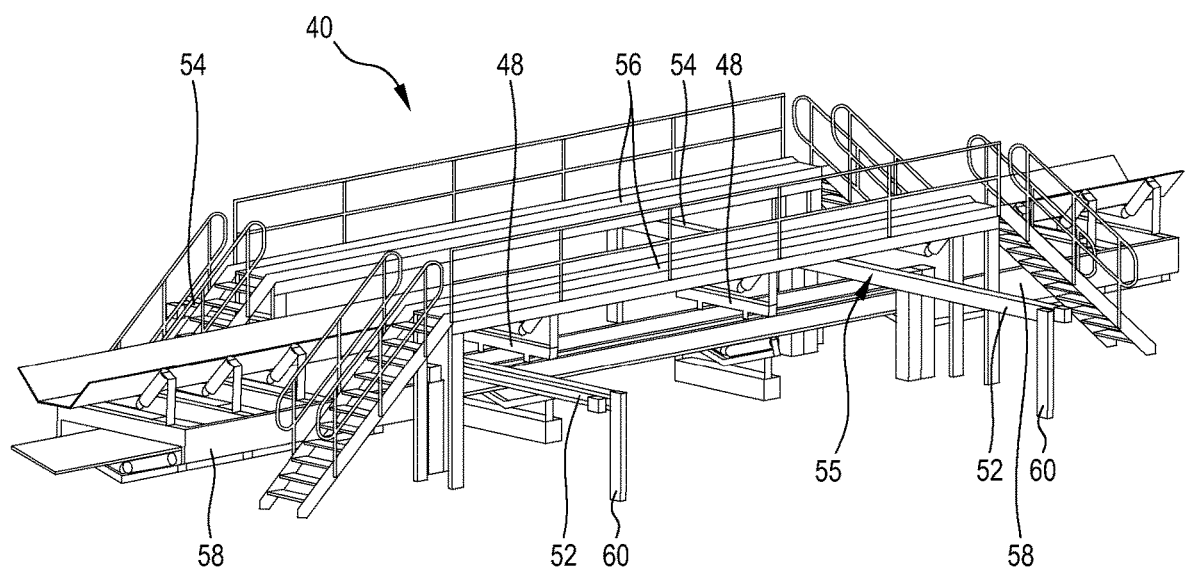
FIG. 6 is a representation of the support system shown FIG. 5 with respective rails in their second positions.

FIG. 6 shows the rails 52, 54 in their second position in which they lie transverse to the yard conveyor 42. The rails 52, 54 are shifted to their second position to facilitate replacement of a current impact table (CIT) of the BWR with a fresh impact table (FIT). The rails 52, 54 are supported on corresponding legs 60. The legs 60 may optionally be fitted with rollers, castors or wheels to more easily enable the rails 52, 54 to be shifted, in this instance swung, between the first position and the second position.

Figure 7:
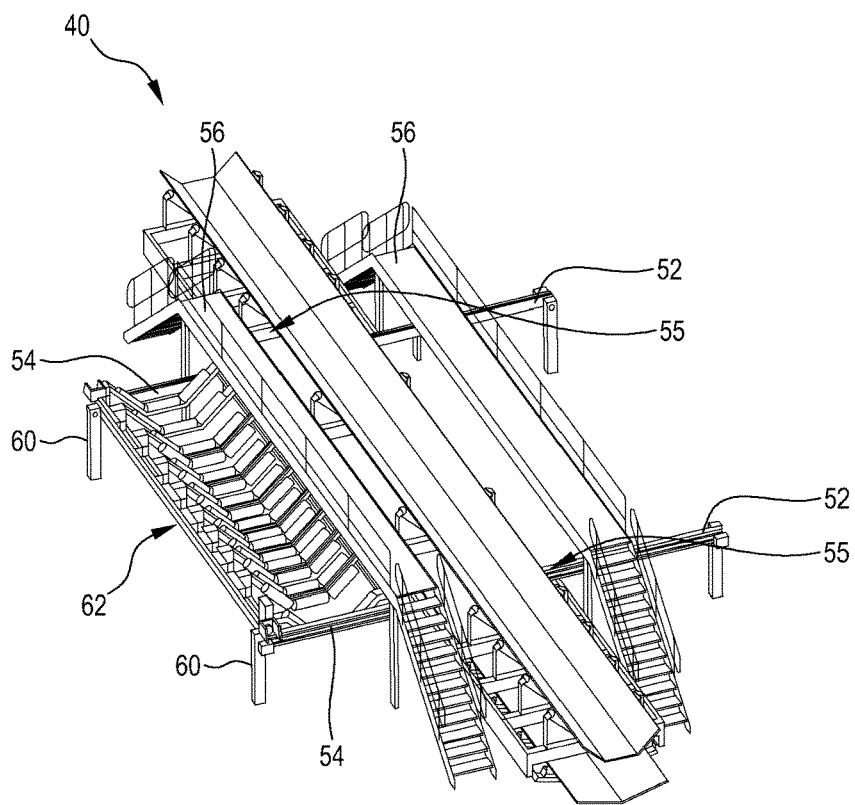
FIG. 7 is a schematic representation of the support system shown in FIG. 5 with a fresh impact table supported on one side of the support system.

FIG. 7 shows a perspective view of the support system 40 from above. This is prior to the BWR being parked over the support system 40. A fresh impact table (FIT) 62 is shown supported on the rails 54. The fresh impact table 62 may be a new impact table or a refurbished impact table. The fresh impact table is placed on the rails 54 by a machine such as a forklift truck.

Figure 8:
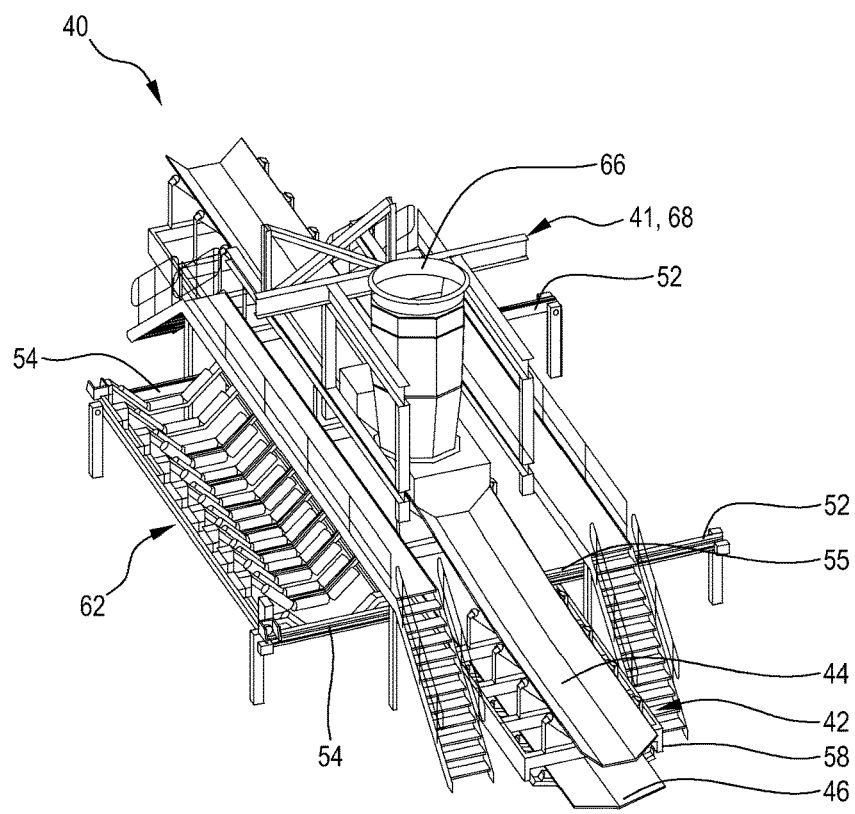
FIG. 8 is a schematic representation of the support system shown in FIG. 5 and showing part of a bucket wheel reclaimer and structural frame to which an impact table for replacement may be coupled.
Figure 9:
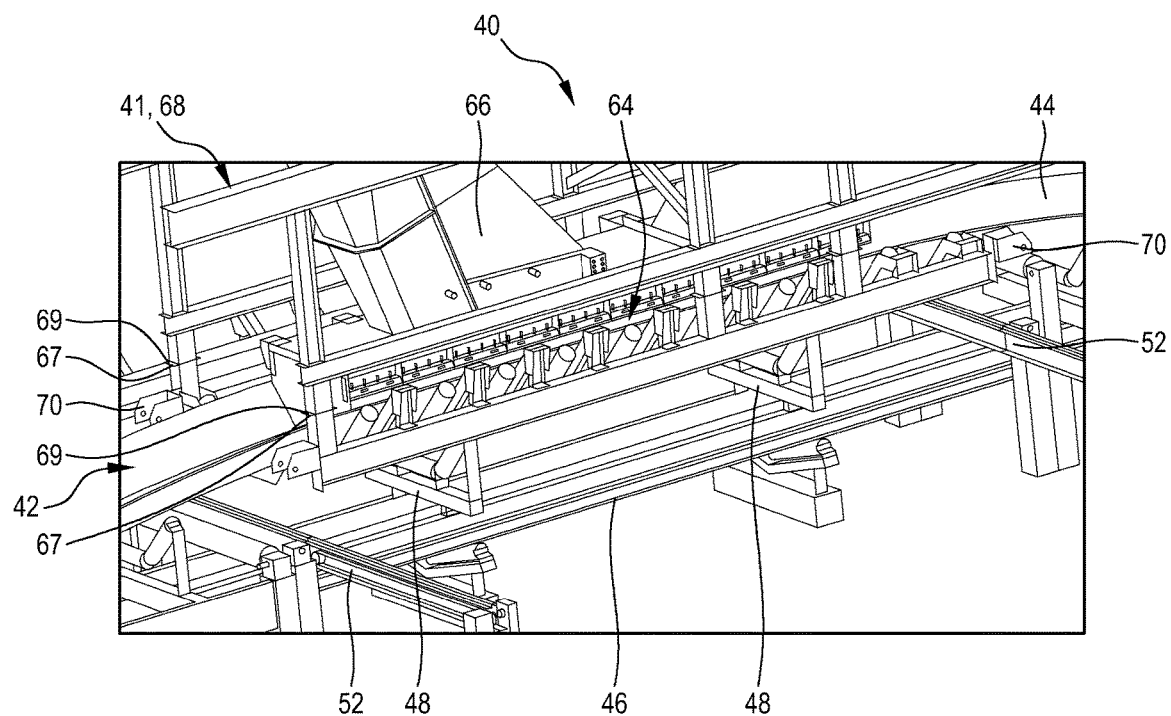
FIG. 9 is a side view of the support system and part of the bucket wheel reclaimer shown in FIG. 8 with the current impact table coupled to the structural frame of the bucket wheel reclaimer and the conveyor idler rollers of the yard conveyor in their normal operating position.
Figure 10:
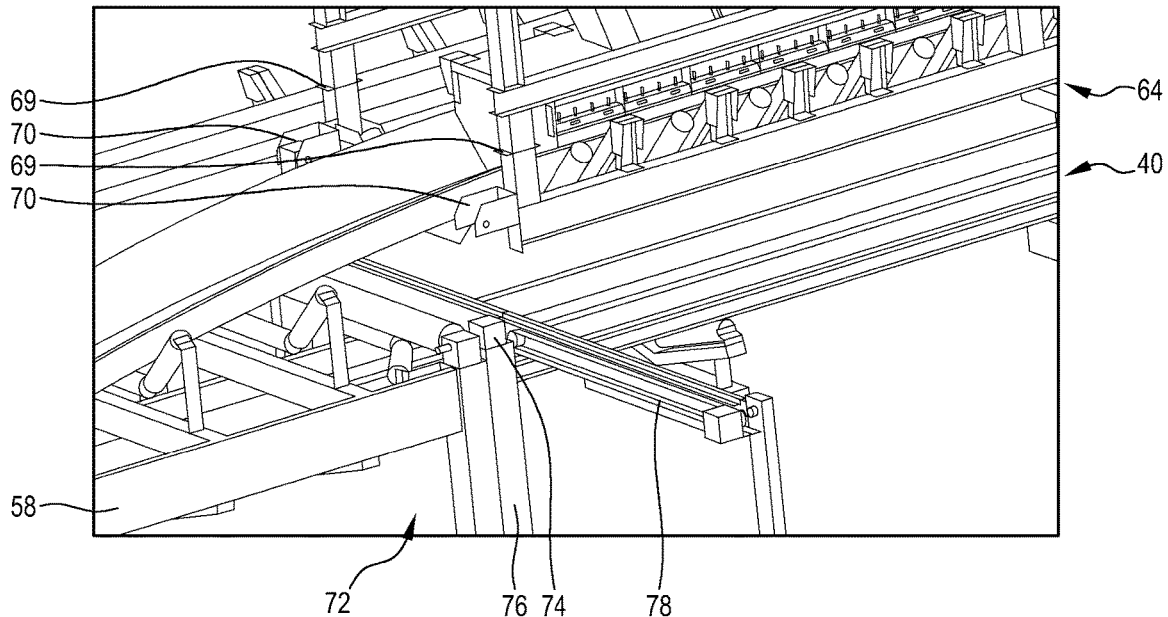
FIG. 10 shows the arrangement of FIG. 9 but with yard conveyor idler rollers retracted.

FIGS. 8-10 depict a bucket wheel reclaimer (BWR) 41 parked over the support system 40 showing an associated transfer chute 66 and part of the structural frame 68 of the BWR. The FIT 62 is seen in FIG. 8 to one side of the conveyor 42. The CIT 64 (not visible in FIG. 8) is coupled to the structural frame 48 by way of connection plates 67 that bolt to complementary connection plates 69 on the structural frame 68 and the CIT 64.

FIGS. 9 and 10 show the CIT 64 isolated and ready for replacement with the fresh impact table 62 previously placed on the rails 54. The CIT 64 is provided with respective pairs of lugs 70 which connect with the support system 40 during the performance of the method 40. In FIG. 9 the idler rollers 48 are shown in their ordinary operating position. However, in FIG. 10 the idler rollers 48 have been tilted and subsequently repositioned away from the footprint of the CIT 64.

As shown in FIGS. 9 and 10 the support system 40 includes a jacking system 72 in the form of hydraulically driven arms 74 which are extendable from corresponding sleeves 76 of the frame 55. The support system 40 is also provided with a respective winch system 78 for each of the rails 52 and 54. Each winch system 78 runs along the length of the respective rails 52, 54.

Figure 11:
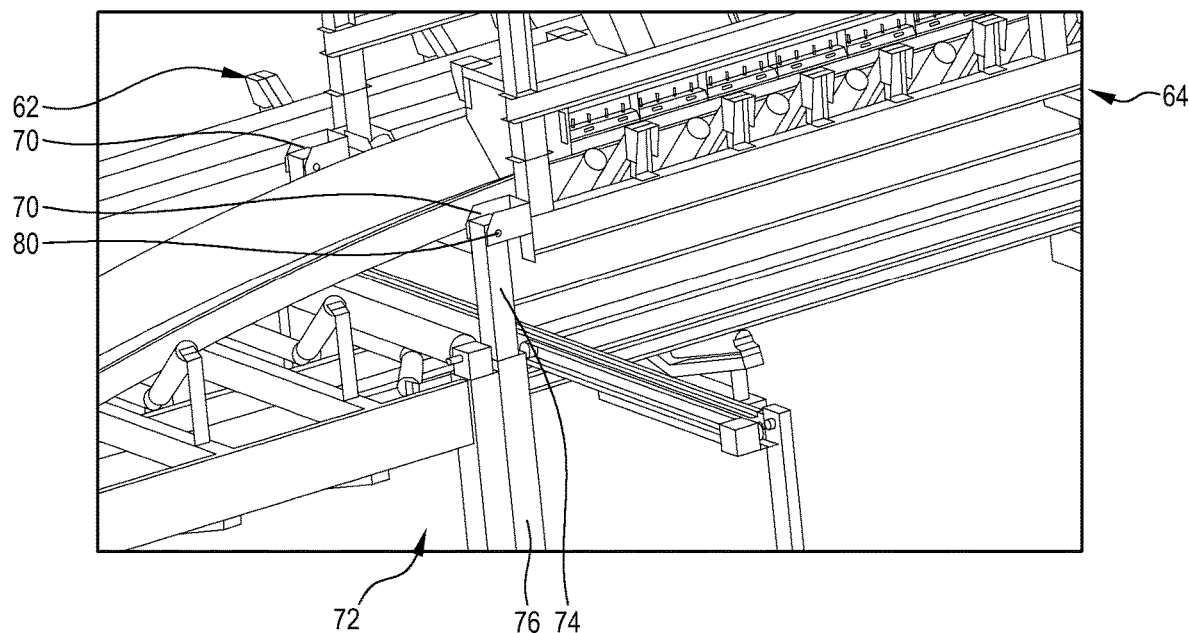
FIG. 11 shows a jacking system of the support system in operation to support the current impact table prior to decoupling from the structural frame.

FIG. 11 shows the CIT 64 being supported by the support system 40 and in particular the jacking system 72. Here the arms 74 of the jacking system are coupled by way of pins 80 to the respective pairs of lugs 70 of the CIT 64.

Figure 12:
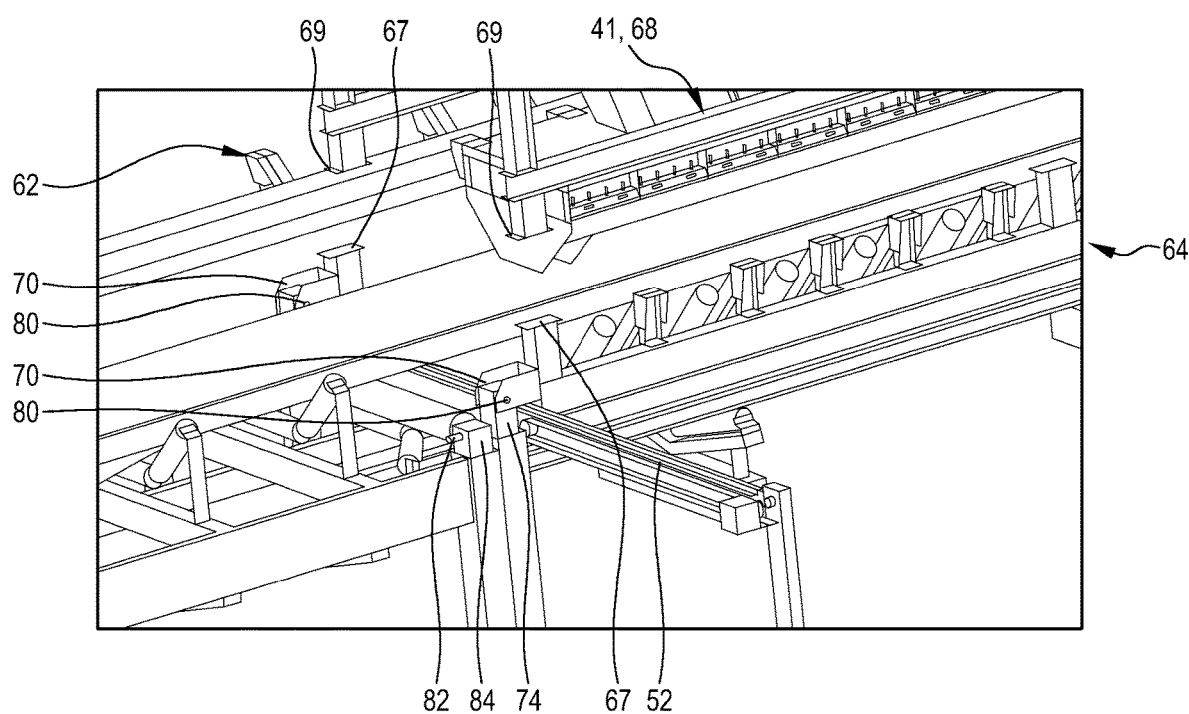
FIG. 12 shows the current impact table being decoupled from the structural frame and lowered by the jacking system to be supported by the support system.

With reference to FIG. 12, with the CIT 64 now supported by the support system 40, the bolted connection to the plates 69 can be released. The CIT 64 is lowered by the support system 40/jacking system 72 to the rails 52. The pins 80 are then removed, disconnecting the jacking system 72 from the CIT 64.

Figure 13:
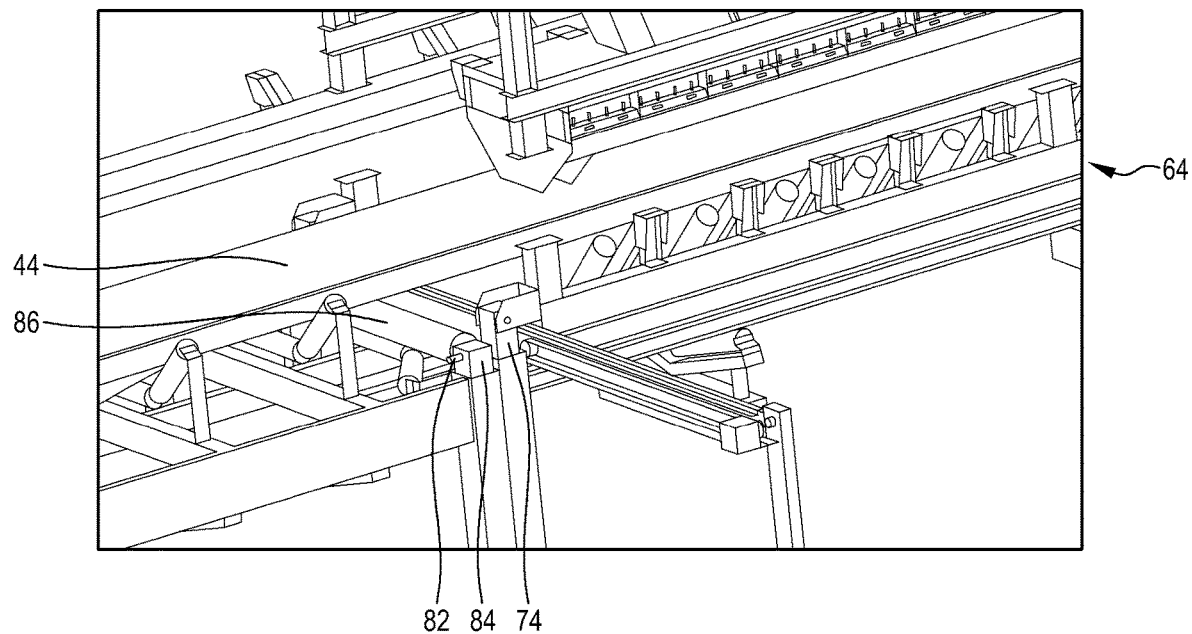
FIG. 13 depicts the jacking system being decoupled from the current impact table and placed in an operable condition for elevating an upper run of the yard conveyor.
Figure 14:
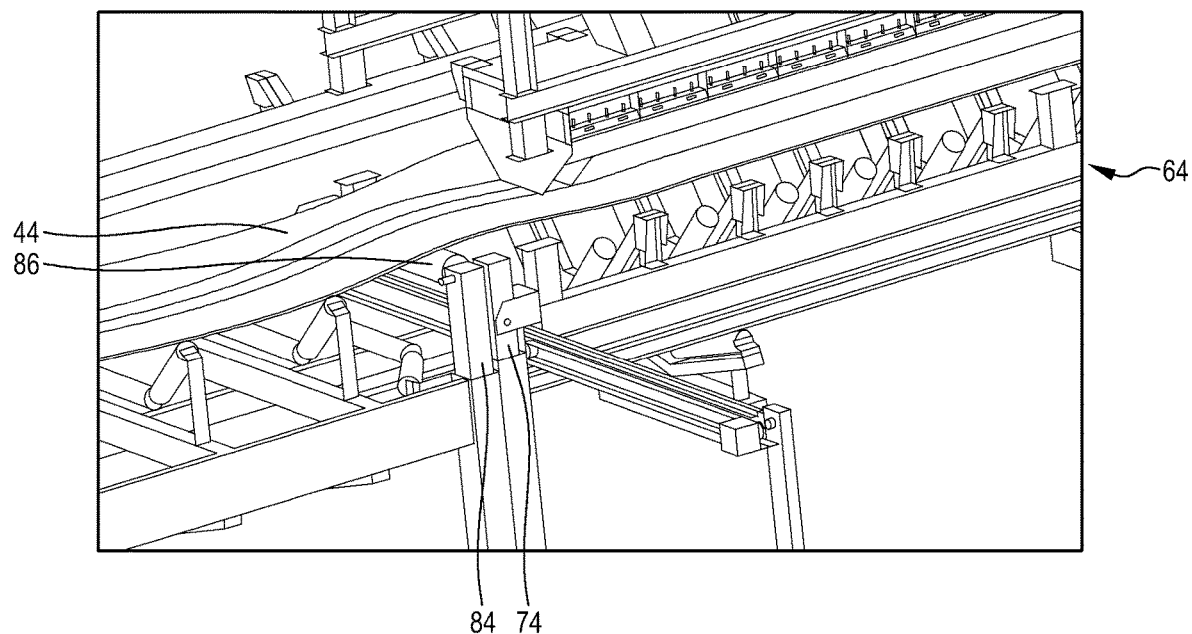
FIG. 14 shows the jacking system in operation lifting the upper run of the yard conveyor out of the confines of the decoupled impact table.
Figure 15:
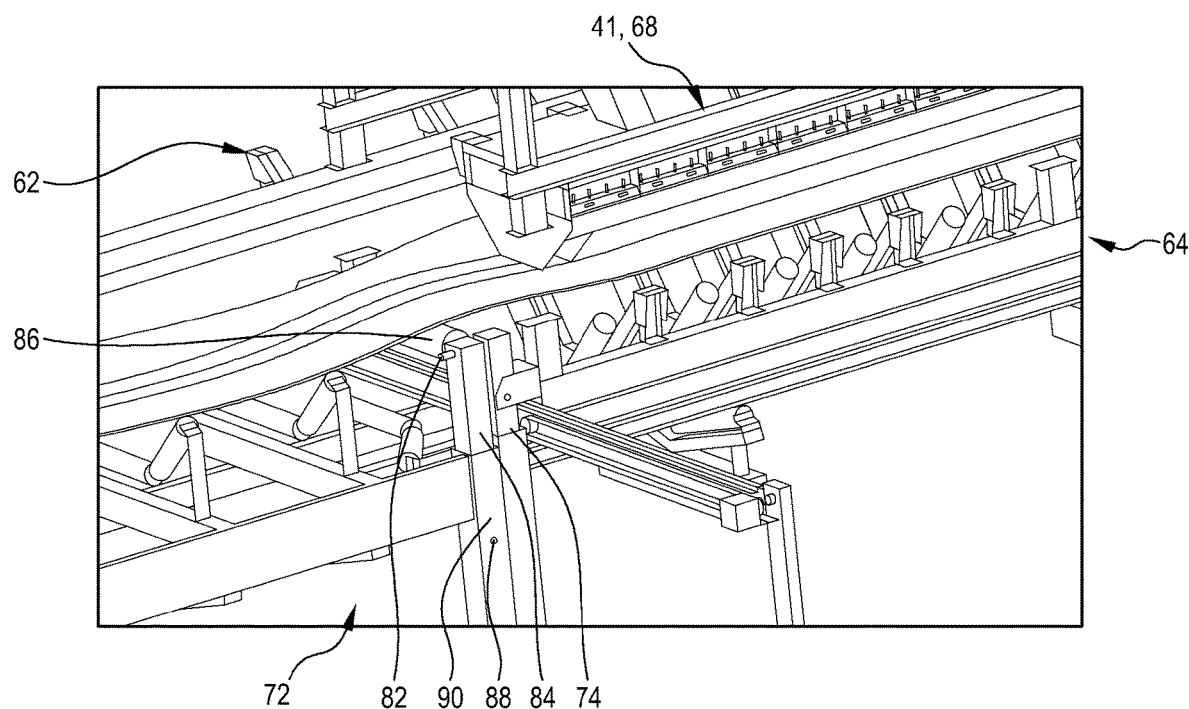
FIG. 15 shows a drag arm of the support system being locked in place to hold the upper run of the yard conveyor while a hydraulically operated arm of the jacking system is decoupled from the drag arm.

From FIG. 12 it will be seen that the upper run 44 of the conveyor 42 resides within the confines of the CIT 64 while supported on the rails 52. To move the CIT 64 laterally along the rails 52 the upper run 44 needs to be lifted away from the CIT 64. With reference to FIGS. 12-15 this is achieved using upper drag arm pins 82, drag arms 84 and lift rollers 86 associated with the support system 40. One possible operating sequence to lift the upper run 44 is as follows:

the arms 74 are further lowered and pins 82 are used to couple the arms 74 with respective drag arms 84 (FIG. 13);

the arms 74 are then hydraulically extended taking with them the respective drag arms 84 and rollers 86 so that the upper run 44 is lifted clear of the CIT 64 (FIG. 14);

locking pins 88 are now inserted into sleeves 90 associated with the drag arms 84 to lock the drag arms in the extended position and holding the upper run 44 clear of the CIT 64 (FIG. 15); and the upper drag arm pins 82 are now be removed decoupling the hydraulically driven arms 74 from the drag arms 84 (also FIG. 15).

Figure 16:
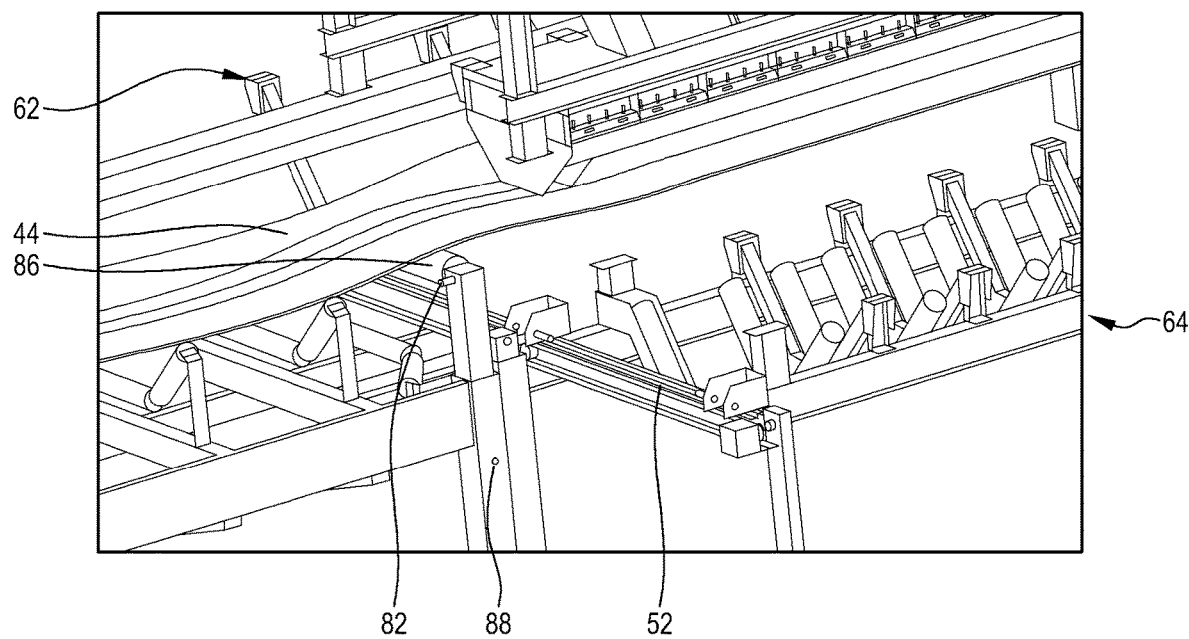
FIG. 16 shows the current impact table being translated laterally to one side of the yard conveyor and the hydraulic arms of the jacking system being retracted.

To move the CIT 64 laterally away from underneath the structural frame 68 the jacking system 72 is operated to lower the arms 74 to lie beneath the lugs 70. Then the winch system 78 is operated to winch the CIT 64 on the rails 52 to one side of the conveyor 42 and BWR. These operations are shown in FIG. 16. Conveniently the winch system 78 uses the same hydraulic pack used for the jacking system 72.

Figure 17:
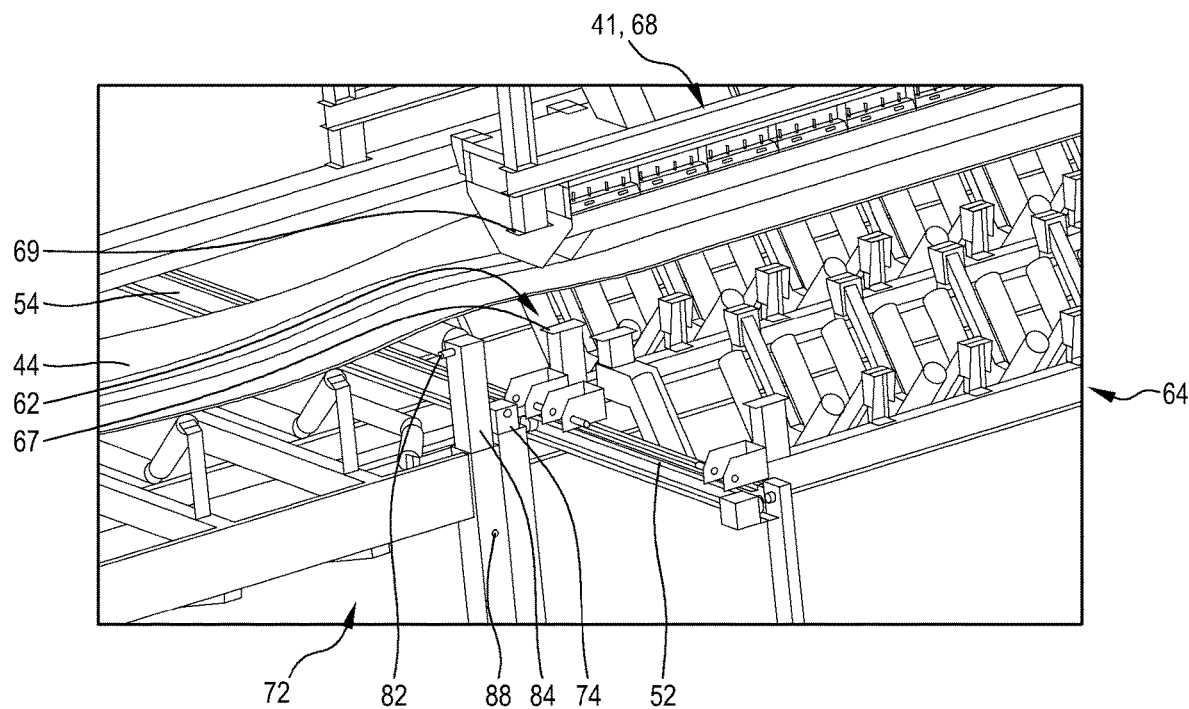
FIG. 17 shows the fresh impact table being translated laterally to lie underneath the structural frame of the bucket wheel reclaimer.

Now the FIT 62 which is supported on the rails 54 is moved laterally by the winch system 78 to lie beneath the structural frame 68 of the BWR as seen in FIG. 17. The upper run 44 is lowered to lie within the confines of the FIT 62 using the following sequence of steps starting from the configuration shown in FIG. 17:

operate the jacking system 72 to lift the arms 74;

insert upper drag arm pins 82 to couple the arms 74 with respective drag arms 84;

remove lower drag arm pins 88 from the sleeves 90 and corresponding the drag arms 84;

operate the jacking system 72 to lower the drag arms 84 and rollers 86.

Figure 18:
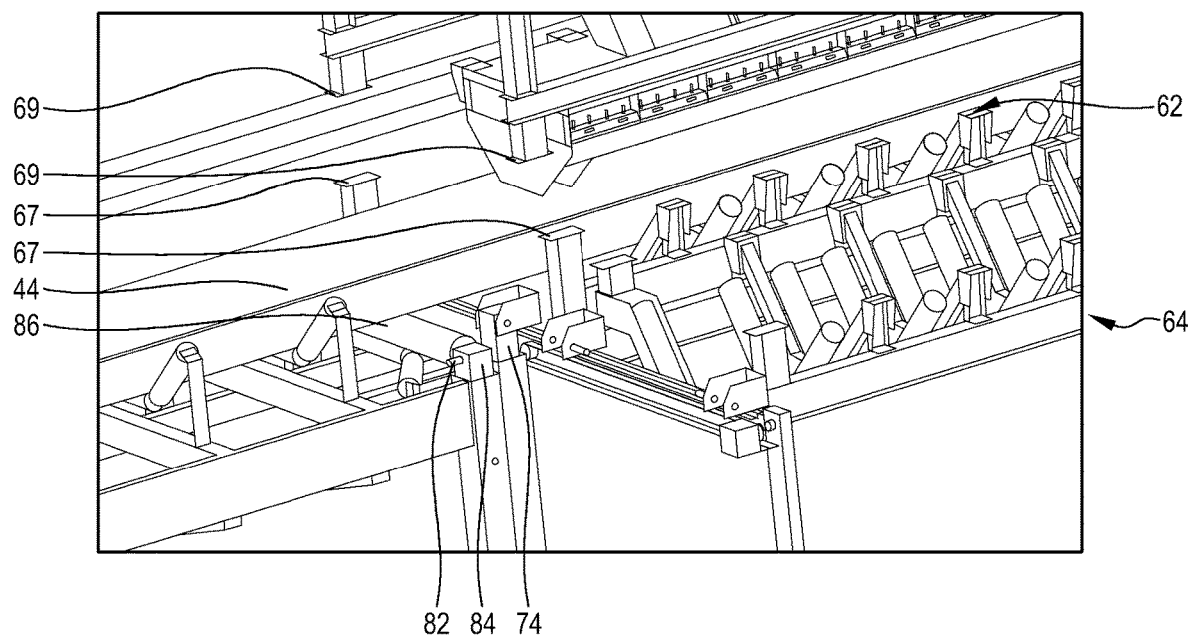
FIG. 18 shows the drag arms of the jacking system being lowered and consequentially the upper run of the yard conveyor sitting within the fresh impact table.

The configuration of the system 40 is now as shown in FIG. 18.

Figure 19:
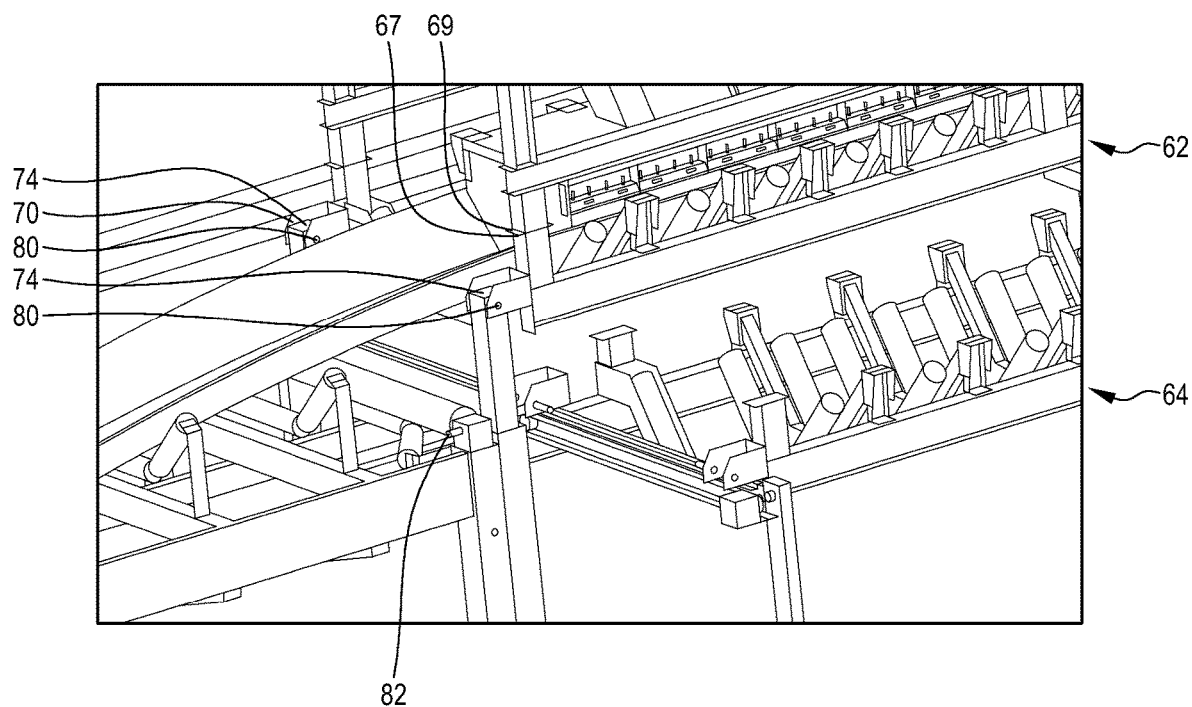
FIG. 19 shows the jacking system in operation coupled to the fresh impact table and lifting the fresh impact table to a position where it can be coupled to the structural frame of the bucket wheel reclaimer.

The FIT 62 is coupled to the structural frame 78 and the BWR 41 by lifting it using the jacking system 72 and bolting the complementary connection plates 69 together. The lifting involves:

removing the upper drag arm pin 82;

operating the jacking system 72 to position the arms 74 so the pins 80 can couple the lugs 70 of the FIT 62 to the arms 74;

operating the jacking system 72 to lift the FIT 62 where the complimentary connection plates 67, 69 of the bolted connected abut, as shown in FIG. 19.

Technicians can now climb onto the platforms 56 to re-bolt the connection plates 67, 69.

Figure 20:
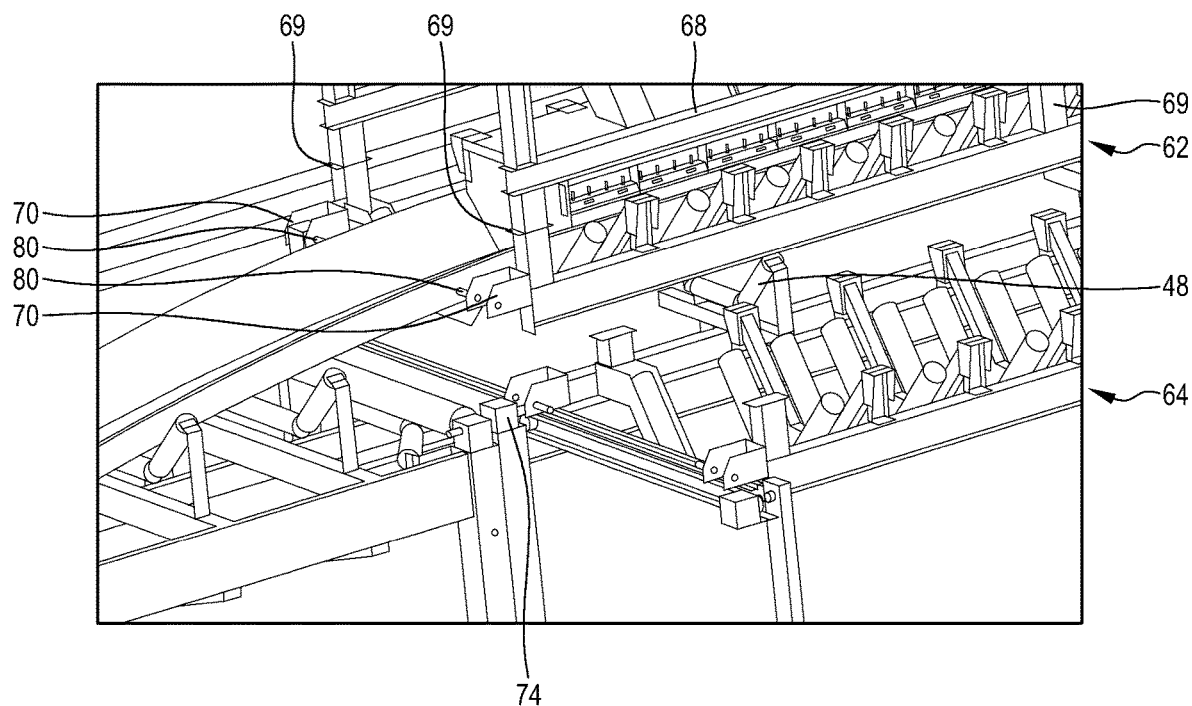
FIG. 20 shows the hydraulic arms of the jacking system released from the fresh impact table which is now coupled to the structural frame; and the yard conveyor idler rollers returned to their operational position beneath the impact table.

Once the FIT 62 is bolted to the structural frame 78 and BWR, the pins 80 are removed, the arms 74 lowered and the yard conveyor carrier idlers 48 are repositioned as shown in FIG. 20. The CIT 64 can be removed from the support system 40 by a forklift truck and taken for refurbishment to be uses as a FIT for the next scheduled impact table maintenance cycle or indeed unscheduled impact table replacement.

To increase efficiency and minimise down time of the BWR the impact table replacement can be scheduled to coincide with the bucket wheel assembly replacement. Examples of methods of bucket wheel assembly replacement are described in applicants co-pending international application number PCT/AU2019/051123.

FIGS. 21-26 show an alternative form of support structure 40a for performing an embodiment of the disclosed method 10 of refurbishing a bucket wheel reclaimer (BWR) by way of replacing its associated impact table. The same reference numbers used in describing the features of the support structure 40 in FIGS. 5-20 are used to denote the same or similar features of the support structure 40a of the current embodiment shown in FIGS. 21-26.

The support structure 40a enables the performance of the same method 10 as depicted in FIG. 1. However as will become apparent the way in which some of the methods steps are performed may differ due to differences in the nature of the respective structures 40 and 40a.

Figure 21:
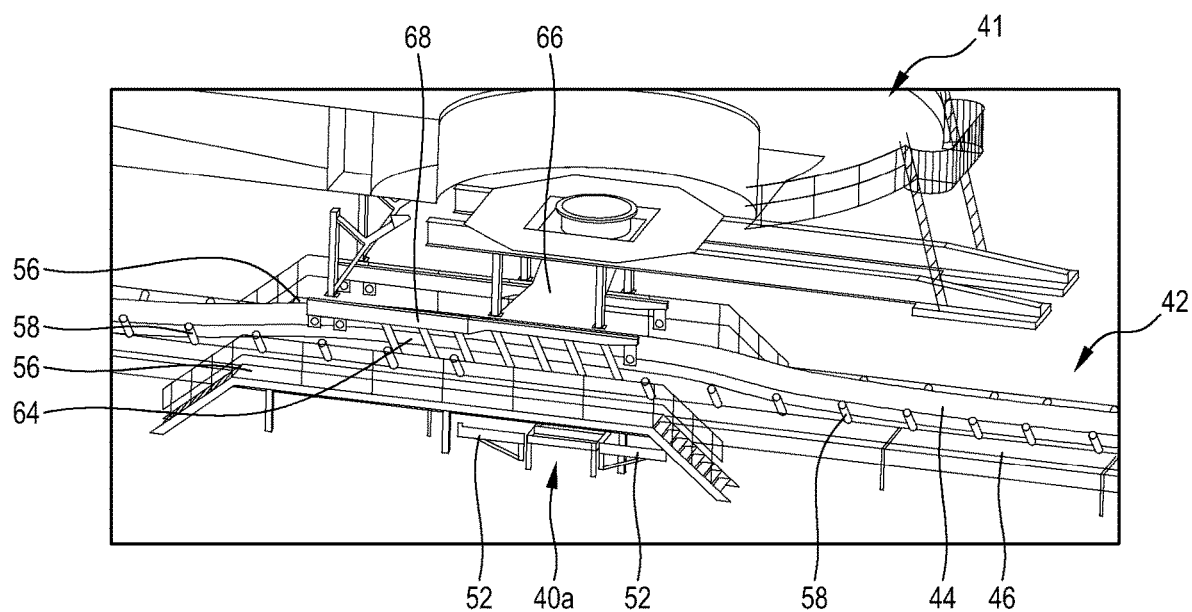
FIG. 21 depicts a portion of a bucket wheel reclaimer in a park position and a second embodiment of the support system that may be used in embodiments of the disclosed method for refurbishing the bucket wheel reclaimer.
Figure 22:
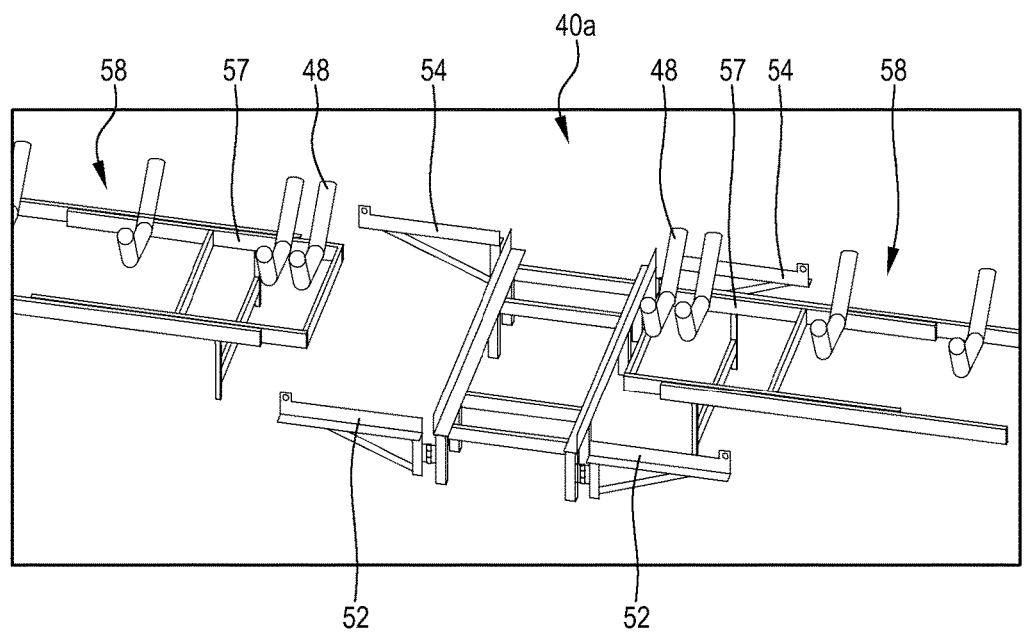
FIG. 22 shows the second embodiment of support system with corresponding rails in their respective first positions and juxtaposed with banks of idler rollers and associated retractable yard conveyor idler rollers in their contracted positions.

FIG. 21 is a schematic representation of a portion of a bucket wheel reclaimer (BWR) 41 located in a park position ready to perform an embodiment of a method 10. This Figure together with FIG. 22 show the current impact table (CIT) 64 attached to the structural frame 68 of the BWR 41 and the transfer chute 66 which feeds material from the BWR conveyor (not shown) onto the portion of upper run 44 of the yard conveyor 42 that traverses the CIT 64. The platform 56 is shown extending along the sides of the CIT 64 and yard conveyor 42. The support structure 40a lies beneath the CIT 64 and includes rails 52, 54 that can be shifted between a first position where they extend parallel to the yard conveyor 42 and a second position which is transverse to the first position. The upper run 44 also runs across respective banks 58 of idler rollers (also known as conveyor stringers) on either side of the CIT 64.

In this embodiment to give sufficient clearance for the impact table replacement the gap of approximately 4 m wide is created between the conveyor stringers/roller banks 58. Two adjacent carrier idlers 48 under the impact table are supported on separate cantilever frames 57 inside the banks 58. The cantilever frames 57 and associated idlers 48 can be retracted in a direction parallel to the yard conveyor creating the required temporary gap.

As shown in FIG. 22 the support structure 40a is of the same general configuration as the support structure 40 shown in FIGS. 5-20. As previously mentioned the support structure 40a includes rails 52 and 54 which are shiftable between the first and second positions. The rails 54 when in their second position can support a fresh impact table (FIT) 62 while the rails 52 when in their second position can support the current impact table 64 after it has been decoupled from the BWR 41.

To enable the extraction of the CIT 64 a section 59 of the platform 56 needs to be cleared. This done by constructing the platform 56 to have sections 59 they can be tilted through 90° similar to a drawbridge. Conveniently the sections 59 on each side of the platform 56 may be designed as counterbalanced self-locking walkway sections they can be easily raised and lowered by hand. Rather than using a hydraulic jacking system as in the first embodiment, the support structure 40a relies on the use of chain blocks to provide support for the CIT 64 and FIT 62 and enable their lowering or lifting and translation along the rails 52, 54.

The method of replacing an impact table of the bucket wheel reclaimer utilising the support system 40a will now be described with reference to FIGS. 23-26.

Figure 23:
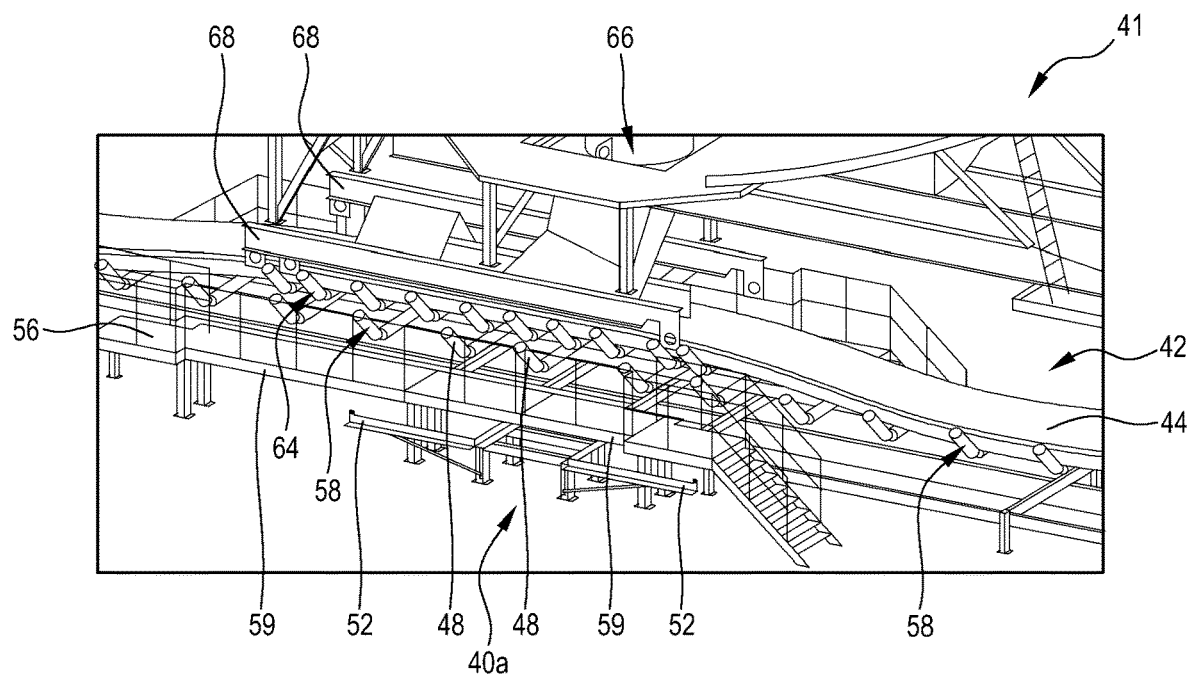
FIG. 23 is a representation of a portion of a bucket wheel reclaimer with its attached current impact table in a park position over the second embodiment of the support system with the rails of the support system in their first positions.

FIG. 23 shows the start position with the BWR 41 in its park position, the CIT 64 straddled on both sides by the platform 56 and the support system 40a located beneath the CIT 64 and platform 56. Both sets of rails 52 and 54 are in their respective first positions running parallel to the yard conveyor 62.

Figure 24:
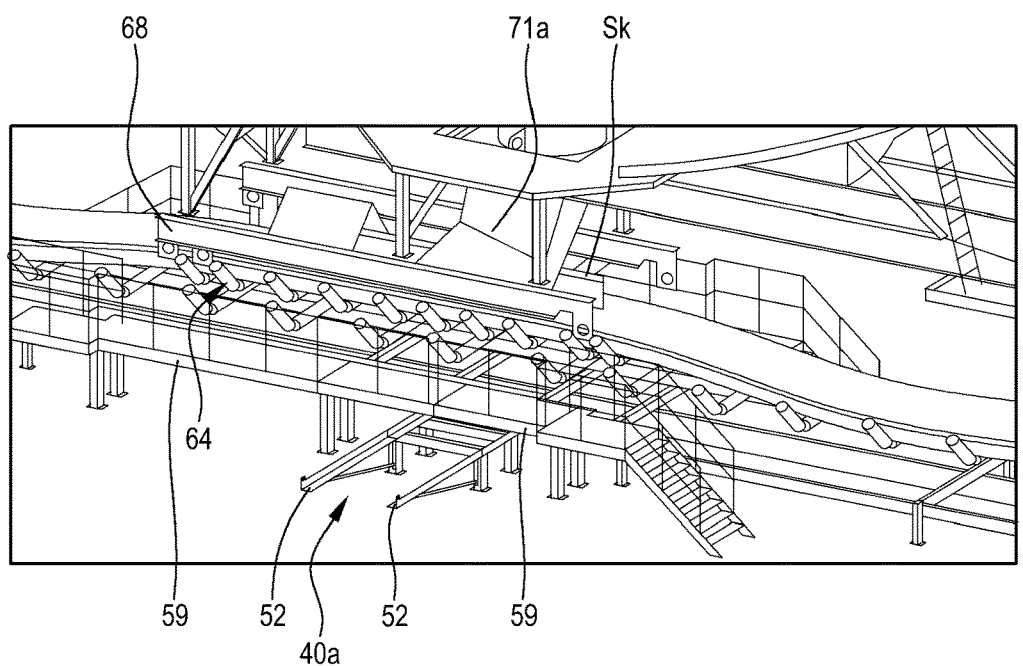
FIG. 24 shows arrangement of FIG. 23 but with the rails of the support system in their second positions.

FIG. 24 shows the rails 52 and 54 shifted to their respective second positions extending transversely of the yard conveyor 42. Although not visible in this Figure a FIT 62 has been placed on the rails 54, for example by use of a forklift truck.

Figure 25:
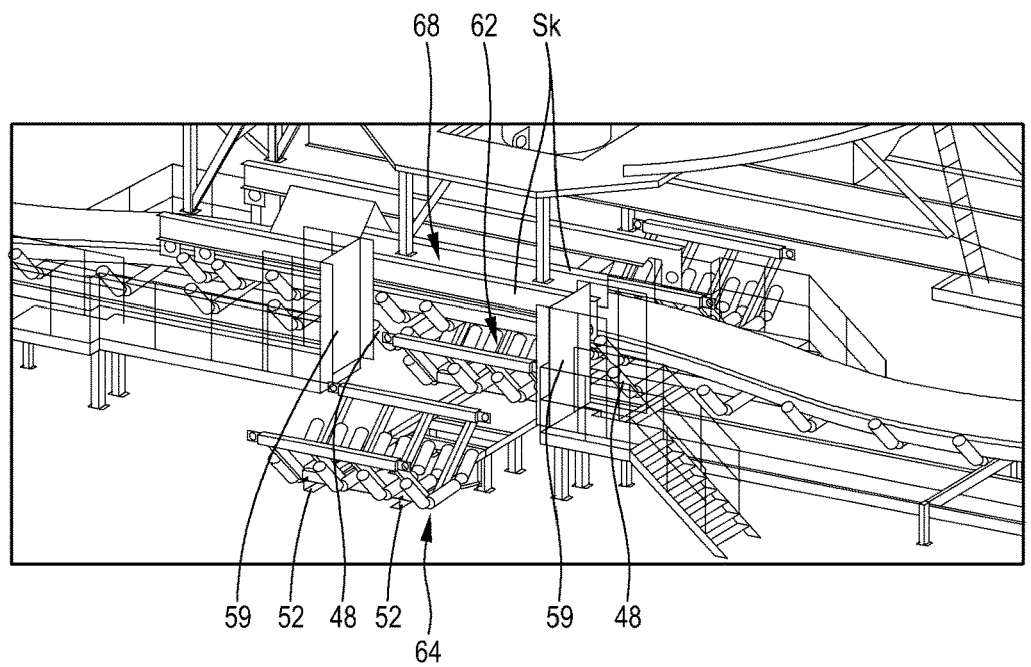
FIG. 25 shows arrangement of FIG. 23 with the current impact table having been decoupled and moved laterally onto one set of rails of the support system, a fresh impact table previously supported in a second set of rails being moved laterally to lie beneath the structural frame of the bucket wheel reclaimer, and sections of a platform turned through 90° to provide respective gaps for the lateral movement of the current and fresh impact tables.
Figure 26:
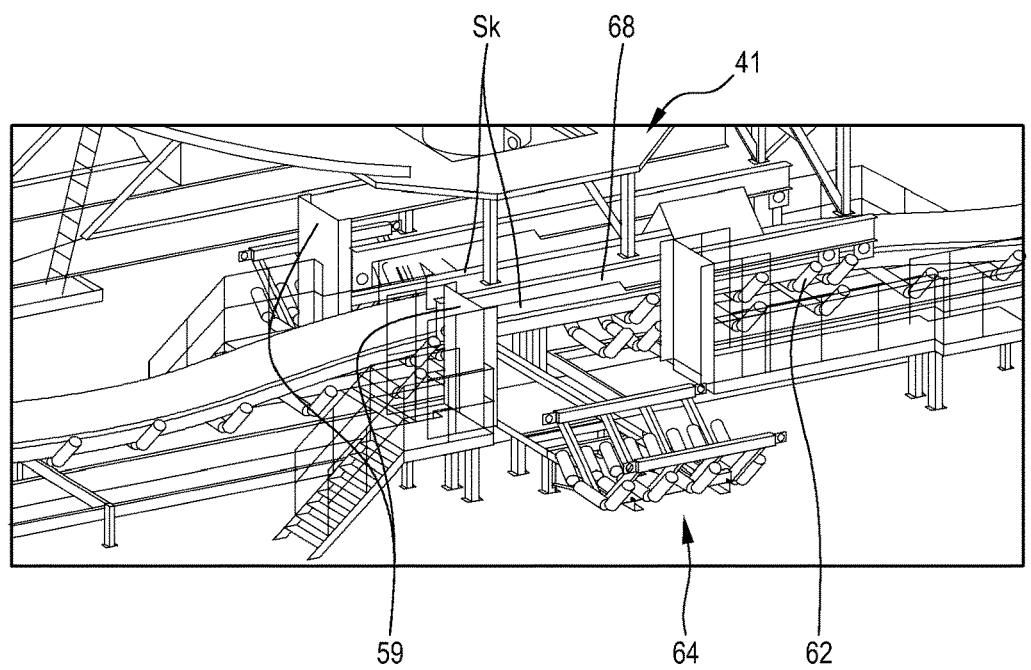
FIG. 26 shows the fresh impact table coupled to the structural frame of the bucket wheel reclaimer and the previously decoupled current impact table awaiting removal from the rails of the support system.
Figure 30:
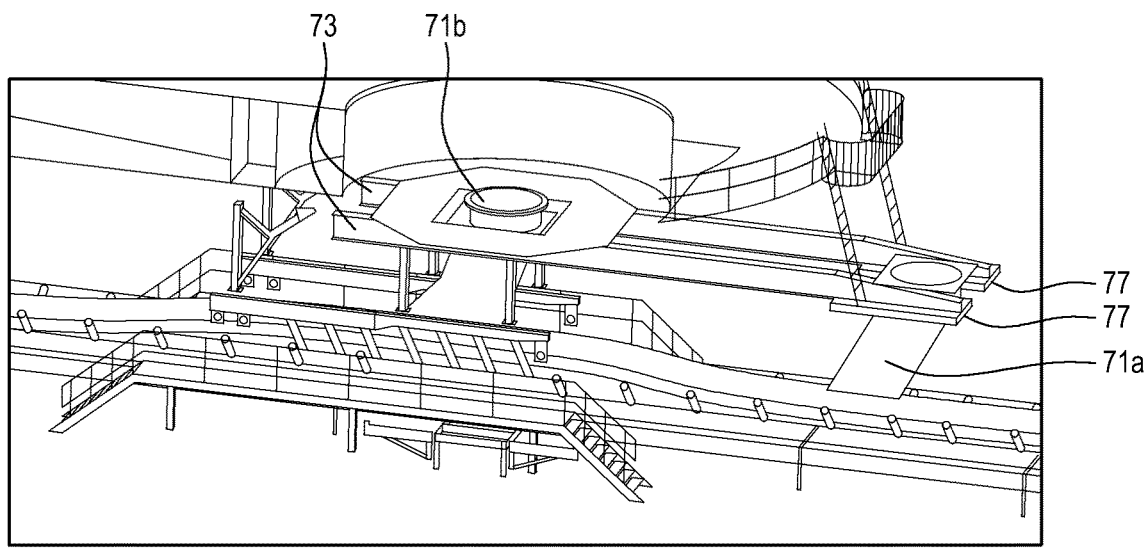
Figure 31:
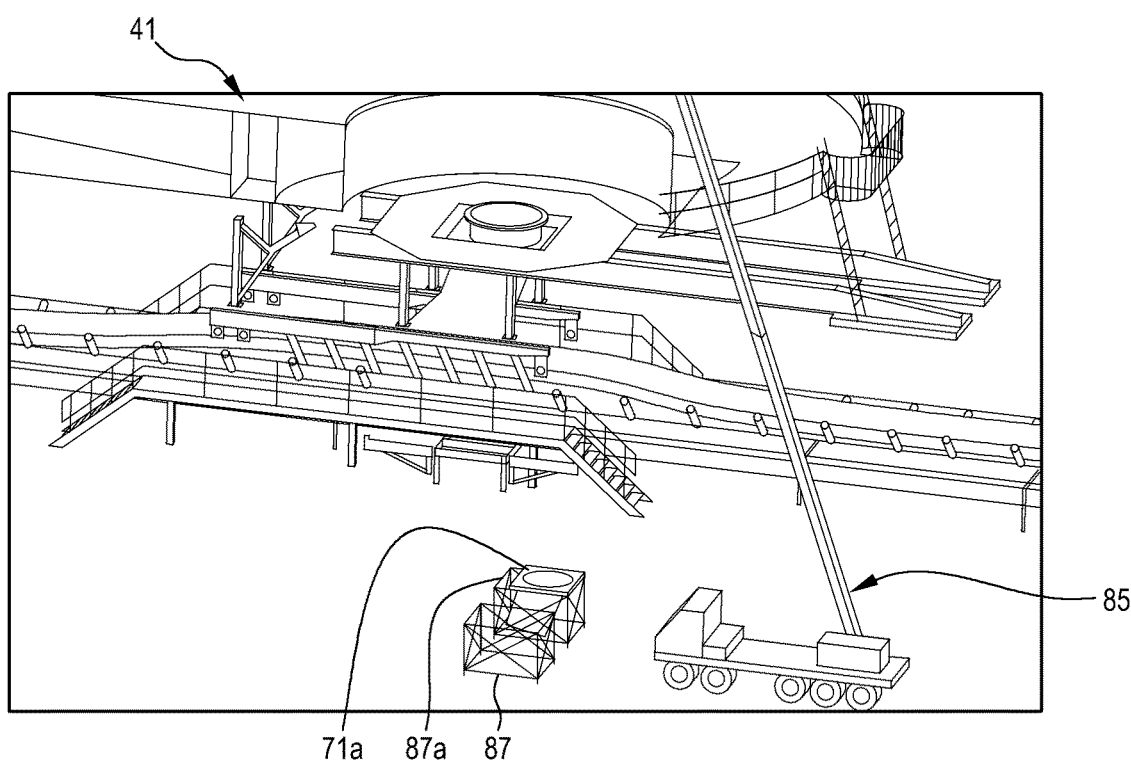

With reference to FIG. 25 the cantilever frames 57 and thus the idler rollers 48 are retracted into the respective banks 56. Four chain blocks (shown) are now used to support the load of the CIT 64 currently connected to the structural frame 68 by supporting pins or bolts. The pin/bolts are now removed, and the chain blocks operated to lower the impact table onto the underlying support structure 40a.

The chain blocks are now removed and the sections 59 of the platform is 56 swung 90° to extend upright and form a gap through which the CIT 64 can be moved sideways onto the rail 62, and a further gap through which the FIT 62 on an opposite side of the yard conveyor 62 can be moved sideways to lie underneath the structural frame 68.

The chain blocks are now connected to the CIT 64 and operated to move it laterally along the rails 52 away from the structural frame 68. The chain blocks are then connected to the FIT 62 to move it laterally along the rails 54 so to lie directly beneath the structural frame 68. This juxtaposition of the CIT 64 and FIT 62 is shown in FIG. 25.

The sections 59 of the platform are now lowered to form a part of the platform walkway to enable technicians to attach the FIT 62 to the structural frame 68. The chain blocks are now used to lift the FIT 62 from the underlying support structure 40a and support the FIT 62 while the technicians make up the pin or bolted connections to the structural frame. A forklift truck can take the CIT 64 from the rails 52 for offsite refurbishment. The rails 52 and 54 are swung back to their respective first positions and the BWR 41 with its fresh impact table 62 is ready for operation.

As with the previously described embodiment most conveniently this method can be performed at the same time as refurbishment of an associated bucket wheel assembly of the BWR 41.

FIGS. 27-31 illustrate one possible arrangement that can be used to also to replace the lower section 71a of the transfer chute 66 during the impact table replacement process both in the presently described embodiment and the previous embodiment described in relation to FIGS. 5-20. The transfer chute 66 comprises the combination of the lower chute section 71a and an upper chute section 71b with sits above and extends into the lower chute section 71a. There is no fixed connection between the lower and upper chute sections 71a, 71b. But there is a floating, solid dust seal ring between the sections &1a and 71b. The may ride on a top flange of the lower chute section 71a.

To facilitate the replacement of the lower section 71a of the chute 66, the BWR 41 reclaimer is fitted with a pair of rail beams 73, running between the installed location of the transfer cute 66 to outside of the BWR circular access platform 75. The section 71a is supported from, and can travel along, the rail beams 73 to a pick-up point that is clear for direct crane access. Service walkways 77 are provided at the pick-up area to offer safe access for crane lashing operation. The service walkways 77 are accessible from the above circular platform 75 via ladders 79.

The lower chute section 71a is fitted with four (4) wheels 81 for vertical support when in service and for the replacement procedure. The lower end of the section 71a is bolt connected to a skirts Sk (shown best in FIGS. 24-26) providing lateral and longitudinal restraint. The skirts Sk are in the form of board like elements that sit either side of the lower chute section 71a and slightly above the belt 42. The skirts Sk help hold ore on the belt 42 after its come out of the chute 66. The skirts Sk are supported on large steel members. While the lower chute section 71a is supported by the four wheels 81 at its upper end, given that the chute section 71a is long and hangs down low it may be connected for example by bolts to the skirts Sk for added restraint.

A top flange 83 of the chute section 71 is designed with a sloping ramp that lifts the seal ring when re-engaging from the replacement operation. Hence, the chute can be driven in and out with no man-handling required in this area.]

In order to traverse the center chute 71 along the rail beams 73 a chain drive assembly (not shown) may be used which can be manually operated via closed loop chain pendant. The chain drive assembly can be located under the rail beams 73, with driven and idling sprockets at each end of the rail beams. A cross bar between a pair of round link chains is located in front of the chute, pushing the chute for the removal travel and pulling the chute for the replacement travel with a gravity loaded lashing hook.

Operation of a crane 85 for lifting the chute 71 is not impeded either by structural cross connections between the rails nor by the travel bar.

One method of replacing lower section 71 is shown with reference to FIGS. 27-31. This method involves the following steps:

Disconnect electrical systems and utilities including "Blocked chute switch" and bag protect wire that may be provided in association with the bucket wheel reclaimer;

Disconnect bolting arrangement between chute section 71 and skirts of the transfer point;

Disconnect a rear wall between skirts and remove;

Drive out the chute section 71 along the rail beams 73 to a pick-up area with the manually operated chain drive assembly;

Connect lashing gear to chute section;

Take the chute section 71 with the mobile crane 85 and remove from the rail beams 73;

Lower chute section 71 onto a transport cradle 87.

A fresh chute section 71a, held in another transport cradle 87a, can then be installed used a reverse of the above describe process.

Figure 32:
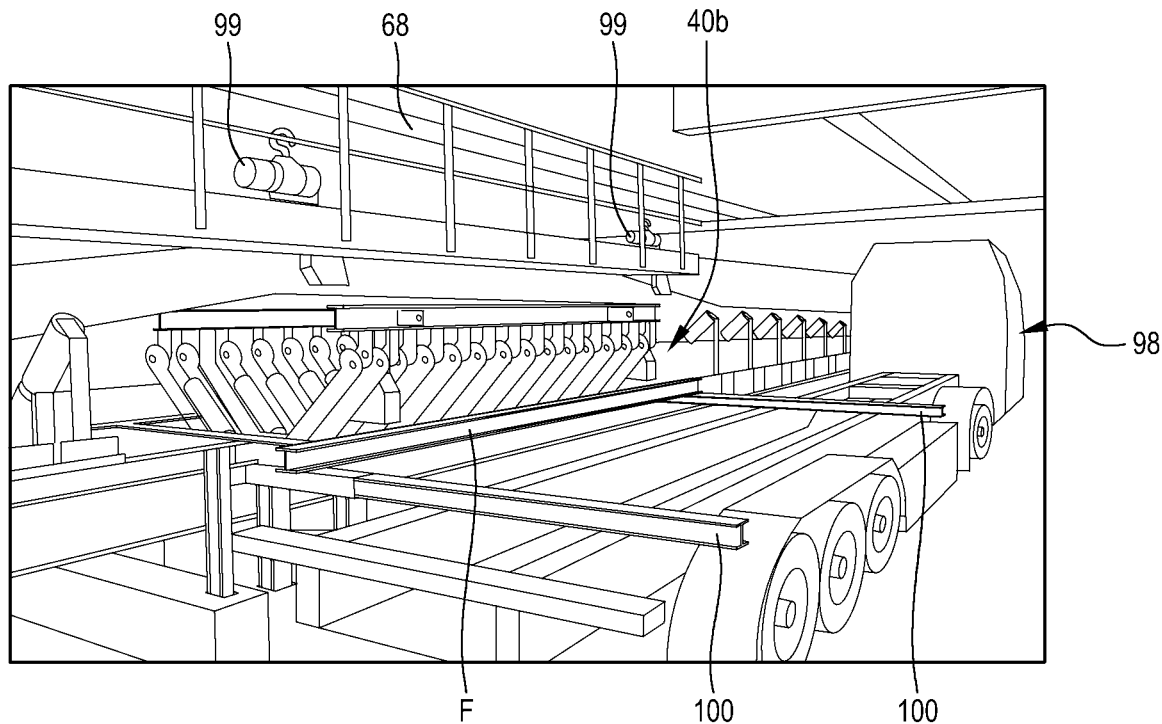
FIG. 32 is a schematic representation of a third embodiment of the support system that may be incorporated in embodiments of the disclosed method of refurbishing a bucket wheel reclaimer.

FIG. 32 show an alternative form of support structure 40b for performing an embodiment of the disclosed method 10 of replacing or refurbishing a bucket wheel reclaimer (BWR) by way of replacing its associated impact table.

The support structure 40b enables the performance of the same method 10 as depicted in FIGS. 21-26. However as will become apparent the way in which some of the methods steps are performed differ due to differences in the nature of the respective structures 40a and 40b.

The substantive difference between the support structure 40a and 40b is that the structure 40b is the combination of a yard conveyor structure in the form a bench frame F and rails 100 provided on a trailer/vehicle 98. Thus, when the CIT 64 it is decoupled from the structural frame 68 of the BWR 41 it lowered onto the yard conveyor structure F then slid sideways onto the rails 100 and can be driven away on the vehicle 98 to a workshop for refurbishment. A FIT 62 may be provided on a the same, or a different vehicle and driven to a location on an opposite side of the yard conveyor to be coupled to the structural frame. Although it is also possible to have the FIT 62 moved laterally beneath the structural frame 68 from the same side as the CIT 64 is removed, after the CIT 64 has been driven away. The walkways beside the impact table may be extended for access to the connection points.

The method of replacing an impact table using the support structure 40b is summarised as follows:

Secure yard belt with slings to the BWR 41. This should lift the yard belt with respect to, and be clear of, the CIT 64 to later facilitate lateral sliding out of the CIT 64, and sliding in of a FIT.

Connect a plurality (for example four) chain blocks 99 between current impact table 64 and BWR 41.

Pretension the chain blocks 99.

Open the connection points to the CIT 64, the connection points may be in the form of a pin connection, bolts or other mechanical fixings Lower the CIT 64 onto a yard conveyor structure F located beneath the CIT 64 by using the chain blocks 99. The yard conveyor structure is a structure that is installed below the impact table to support an impact table that has been decoupled from or not yet coupled to the BRW. It may for example take the form of a bench frame.

Disconnect chain blocks to CIT 64.

Place the trailer 98 beside the yard conveyor structure F.

Connect the trailer with the yard conveyor structure F by using sliding beams 100.

Slide out the impact table onto the trailer 98.

Disconnect the sliding beams 100 from the yard conveyor structure F.

Drive the trailer 98 to transport the CIT to a refurbishment or other location.

Bring in the FIT 62 on a new trailer 98; or the same as previously used for the CIT after the CIT has been lifted off.

Connect the sliding beams 100 to the yard conveyor structure F.

Slide in the FIT 62 (not shown) along the beams 100.

Connect chain blocks 99.

Lift up FIT 62.

Connect FIT to the structural frame 68/BWR 41. Remove all chain blocks 99, disconnect the beams 100, drive the trailer away.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

The invention claimed is:

1. A method of refurbishing a bucket wheel reclaimer (BWR) having structural frame, a chute supported by the structural frame, a yard conveyor for receiving material from the chute and an impact table supported by the structural frame below a portion of an upper run of the yard conveyor, the method comprising:
   decoupling a current impact table from the BWR structural frame;
   lowering the current impact table from the structural frame;
   moving the current impact table laterally away from and to one side of the yard conveyor;
   moving a fresh impact table laterally to a location beneath the upper run of the yard conveyor; and
   coupling the fresh impact table to the structural frame.

2. The method according to claim 1 wherein the fresh impact table is moved laterally from a side opposite to the one side of the yard conveyor.

3. The method according to claim 1 comprising supporting the current impact table while the current impact table is being decoupled.

4. The method according to claim 1 comprising after decoupling and before moving the current impact table laterally, lowering the current impact table to an underlying support.

5. The method according to claim 4 wherein moving the current impact table laterally comprises translating the current impact table along the support.

6. The method according to claim 5 wherein translating the current impact table comprises shifting a first portion of the support from a first location to a second location wherein the current impact table is translated on the first portion of the support when the first portion is in the second location.

7. The method according to claim 1 wherein coupling the fresh impact table comprises, lifting the fresh impact table from the location beneath the upper run of the yard conveyor to facilitate connection to the BWR.

8. The method according to claim 4 wherein coupling the fresh impact table comprises, lifting the fresh impact table from the location beneath the upper run of the yard conveyor to facilitate connection to the BWR; and moving the fresh impact table laterally comprises translating the fresh impact table along the support.

9. The method according to claim 8 wherein moving the fresh impact table laterally comprises placing the fresh impact table on a second portion of the support on the opposite side of the yard conveyor.

10. The method according to claim 9 wherein placing the fresh impact table on the second portion comprises moving the second portion of the support from a first location to a second location at which the fresh impact table can be supported on the underlying support.

11. The method according to claim 10 comprising translating the fresh impact table along the second portion to the location beneath the BWR.

12. The method according to claim 1 comprising using a machine to move the current impact table or the fresh impact table.

13. The method according to claim 12 comprising providing a winch system as the machine.

14. The method according to claim 12 comprising providing a jack system as the machine.

15. The method according to claim 1 comprising before moving the current impact table laterally away from and to one side of the yard conveyor, lifting the portion of the upper run of the conveyor with respect to the impact table.

16. A support system for performing the method according to claim 1 comprising:
   a structure having first and second portions, the portions being moveable between respective first and second locations, wherein in the first location the portions extend in a direction parallel to the direction of travel of the yard conveyor and in the second location the portions extend in a lateral direction with respect to a direction of travel of the yard conveyor.

17. The support system according to claim 16 comprising a plurality of jacks capable of moving vertically for supporting the impact table and elevating or lowering the impact table.

18. The support system according to claim 16 comprising a plurality of chain blocks capable of lowering an impact table from the BWR or elevating an impact table to a connection location on the BWR.

19. The support system according to claim 18 wherein the chain blocks are deployable to translate an impact table along the first or second portions when in their respective second positions.

20. The support system according to claim 16 comprising a winch system capable of moving the impact table along the first and second portions when in their respective second positions.

* * * * *